United States Patent [19]

Kang

[11] Patent Number: 6,012,131
[45] Date of Patent: Jan. 4, 2000

[54] HIGH SPEED TRANSLATION LOOKASIDE BUFFER EMPLOYING CONTENT ADDRESS MEMORY

[75] Inventor: Hoai Sig Kang, Kyoungki-do, Rep. of Korea

[73] Assignee: Hyundai Electronics Industries. Co., Ltd., Ichon-shi, Rep. of Korea

[21] Appl. No.: 08/964,903

[22] Filed: Nov. 5, 1997

[30] Foreign Application Priority Data

Nov. 6, 1996 [KR] Rep. of Korea ...... 96-52481
Nov. 14, 1996 [KR] Rep. of Korea ...... 96-54093

[51] Int. Cl.$^7$ ........................... G06F 12/10
[52] U.S. Cl. ............ 711/205; 711/206; 711/207
[58] Field of Search ............... 711/205, 206, 711/207, 108; 365/49

[56] References Cited

U.S. PATENT DOCUMENTS

| | | | |
|---|---|---|---|
| 5,440,707 | 8/1995 | Hayes et al. ...... | 711/3 |
| 5,606,683 | 2/1997 | Riordan ...... | 711/207 |
| 5,740,410 | 4/1998 | McDermott ...... | 713/501 |
| 5,805,490 | 9/1998 | Machida ...... | 708/700 |
| 5,835,963 | 11/1998 | Yoshioka et al. ...... | 711/207 |
| 5,893,931 | 4/1999 | Peng et al. ...... | 711/206 |
| 5,907,867 | 5/1999 | Shinbo et al. ...... | 711/207 |

*Primary Examiner*—John W. Cabeca
*Assistant Examiner*—Christopher S. Chow
*Attorney, Agent, or Firm*—Jacobson, Price, Holman & Stern, PLLC

[57] ABSTRACT

A translation lookaside buffer (TLB) for use of a microprocessor, using a content address memory (CAM), includes a block for generating a control clock for precharging a clock and an enable clock for driving data; a CAM block for comparing a linear address with stored data and generating hit signals representing whether or not its comparison result is a coincidence therebetween; a block for decoding the linear address applied from the outside, the linear address being for a distinction of respective entries; a hit signal generating block for outputting selection signals indicating where the hit signals inputted from the CAM block are generated; a block for storing a physical address; a block for selecting one out of the physical addresses outputted from each area of the storing block in response to the selection signal provided from the hit signal generating block; and a block for sensing a signal applied from the selection block.

18 Claims, 8 Drawing Sheets

HIGH SPEED TRANSLATION LOOKASIDE BUFFER EMPLOYING CONTENT ADDRESS MEMORY

FIELD OF THE INVENTION

The present invention relates to a translation lookaside buffer (TLB) for use of a microprocessor; and, more particularly, to a TLB, which is capable of converting a linear address into a physical address at a high speed by using a tag content address memory(CAM).

DESCRIPTION OF THE PRIOR ART

There has been recently required a high speedy process over 150 MHz in a microprocessor and it is, therefore, inevitable to need to provide a translation lookaside buffer (hereinafter referred to TLB) having a high speed operation to the microprocessor. In order to obtain the high speed operation of the TLB, it should be desired to complete an access process to the TLB and a cache access process during one process cycle.

Such a TLB generally serves to receive upper 20 bits of a linear address and convert them into a physical address which is coupled to a code/data cache memory. The TLB includes a tag random access memory(RAM) and a data RAM. The tag RAM serves to store upper 17 bits of the linear address and is indexed by using lower 3 bits thereof. The data RAM serves to store 20 bits of a physical address corresponding to each entry of the Tag RAM. That is, the data RAM includes 4 storage sections, each storage section stores 8 entries so that total 32 entries is stored the data RAM and each 4 entries are outputted from the storage section by means of 4 ways, simultaneously.

Figure 1:
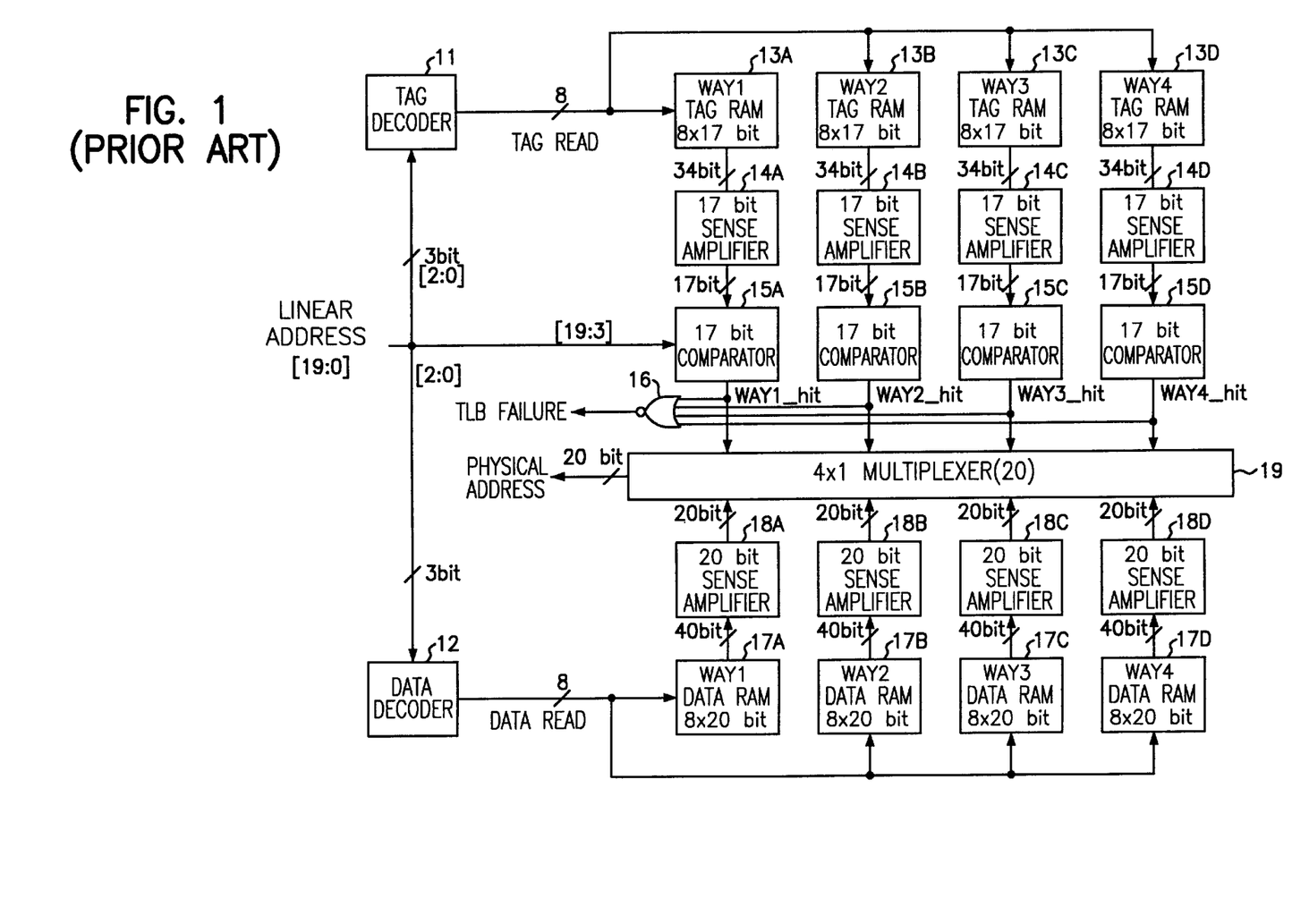
FIG. 1 shows a block diagram of a conventional translation lookaside buffer (TLB)

Referring to FIG. 1 showing a block diagram of a conventional TLB, the TLB is provided with a tag decoder 11, a data decoder 12, a tag RAM block 13, sense amplifier blocks 14 and 18, a comparator block 15, an NOR gate 16, a data RAM block 17 and a multiplexer 19. Specifically, the conventional TLB contains four tag RAM's having each 8×17 bits, four sense amplifiers having each 17 bits, four comparators having each 17 bits, four data RAM's having each 8×20 bits, four sense amplifiers having each 20 bits, twenty multiplexers having each 4×1 bits, and two decoders having each 3×8 bits.

Operations of the conventional TLB for receiving a linear address and converting the linear address into a physical address are described as follows.

A tag decoder 11 and a data decoder 12 decode lower 3 bits of an inputted linear address and output a tag reading signal of 8 bits and a data reading signal of 8 bits, respectively. The 8 bit tag reading signal is inputted to tag RAM's 13A, 13B, 13C and 13D constituting of 4 ways, and the 8 bit data reading signal is inputted to data RAM's 17A, 17B, 17C and 17D constituting of 4 way, simultaneously, to thereby allow one of 8 entries stored in each tag RAM and corresponding one stored in each data RAM to be enabled. Such tag RAM's and data RAM's are formed by using a static RAM. When each entry is respectively enabled in response to each of the tag reading signal and the data reading signal, each of four tag RAM's 13A to 13D outputs stored data of 34 bits to each of the 17-bit sense amplifiers 14A to 14D, by 17 bits via bit lines (bit) and bit bar lines (/bit); and each of four data RAM's 17A to 17B outputs stored data of 40 bits to each of the 20-bit sense amplifiers 18A to 18D, by 20 bits through bit lines (bit) and bit bar lines (/bit).

Each of four 17-bit sense amplifiers 14A to 14D receive the 34-bit data from each of four tag RAM's 13A to 13D and sense valid data according to an electric potential difference change between the bit lines (bit) and the bit bar lines (/bit), to then output the valid data to each of four 17 bit comparators 15.

Four 20-bit sense amplifiers 18 receive the 40 bit data from each of four data RAM's 17, and sense valid data based on the electric potential difference change between the bit lines (bit) and the bit bar lines (/bit), to then output the valid data to the 4×1 multiplexers 19.

Each of four comparators 15A to 15D performs a full comparison between upper 17 bits of the inputted linear address and the sensed 17 bits outputted from each of the sense amplifiers 14A to 14B, and outputs a way hit signal WAY_hit representing a high voltage state when all the bits are the same.

The NOR gate 16 outputs a TLB miss signal denoting a high voltage state in order to inform it to a system controller (not shown), if all output signals from four comparators 15 represent a low state, or if the tag RAM's 13A to 13D do not have the data same as the inputted linear address.

In the 4×1 multiplexers 19, when the way hit signal WAY_hit representing a high voltage state is received from one of four comparators 15, data outputted from one of the sense amplifier 18A to 18D of a corresponding way is selected to be thereby outputted as a physical address. In other words, if a hit signal from the comparator 15A is enabled, namely a high voltage state, the 4×1 multiplexer 19 selects the 20 bit data outputted from the data RAM 17A and outputs the data as the physical address converted from the inputted linear address. In order to executes its selection in a unit bit, the multiplexer 19 includes 20 number of 4×1 multiplexers.

As may be seen from the above, since the conventional TLB should have above 148 sense amplifiers and four 17-bit comparators, the TLB has to have so large size and increased power consumption, resulting in a high manufactural and operational cost. Further, it is not suitable for use in a recent microprocessor requiring a high speed function because an access critical path of the conventional TLB necessarily employs decoding time, tag RAM reading time, sensing time, comparison time and multiplexing time.

SUMMARY OF THE INVENTION

It is, therefore, a primary object of the invention to provide a TLB, which is capable of processing data at a high speed by constituting a tag block with a content address memory (CAM) so as not to need comparison time therein and reducing a power consumption with a small size by largely lessening the number of sense amplifiers.

In accordance with the present invention for achieving the above object and others, there are provided a block for generating a control clock and an enable clock, the control clock being for precharging a clock applied from the outside by an optional reference voltage, the enable clock being for driving data; a CAM block divided into a plurality of regions based on respective entries, for receiving the control clock and the enable clock from the clock generating block, comparing a linear address inputted from the outside with stored data, and generating hit signals through each of the regions, wherein the hit signals represent whether or not its comparison result is a coincidence therebetween; a block for receiving, from the outside, the linear address used for distinguishing respective entries, and decoding the linear address; a hit signal generating block for receiving the control clock from the clock generating block and decoded data from the decoding block, and outputting selection signals, the selection signals indicating where the hit signals inputted from the CAM block are generated; a block divided into a multiple number of storing areas, for storing the physical address and outputting the data stored at memory cells corresponding to enabled word lines through each of the areas in response to the decoded data outputted from the decoding block; a block for selecting one out of the physical addresses outputted from each area of the storing block in response to the selection signal provided from the hit signal generating block; and a block for sensing a signal applied from the selection block.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

The preferred embodiment of the present invention is described in detail referring to FIGS. 2 to 8 as follows.

Figure 2:
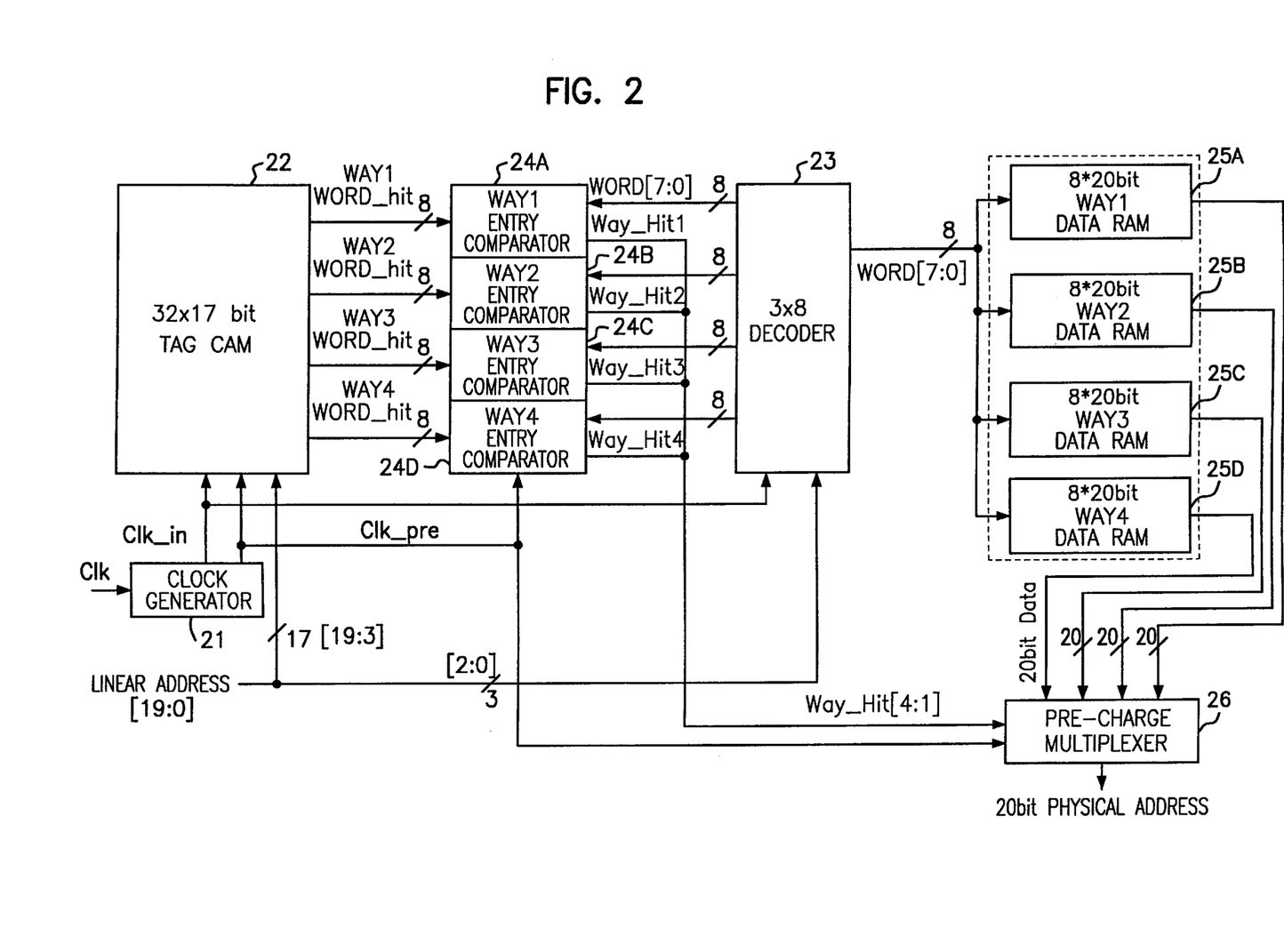
FIG. 2 represents a block diagram of a TLB in accordance with the present invention.

Referring to FIG. 2, there is illustrated a block diagram of a TLB in accordance with the present invention. The TLB includes a clock generating block 21, a tag CAM 22, a decoder 23, an entry comparator block 24 and a data RAM block 25, a multiplexer 26.

The clock generating block 21 receives a clock Clk from a system controller (not shown); provides an enable clock Clk_in to the tag CAM 22 and the decoder 23; and transfers a control clock Clk_pre to the tag CAM 22 and the entry comparator block 24, the control clock Clk_pre being precharged in an initial value.

The 32×17 bits CAM 22 receives upper 17 bits of a linear address and pre-charges word comparison lines by using a reference voltage Vdd during a high voltage state of the control clock Clk_pre inputted from the clock generating block 21. Then, while the enable clock Clk_in is a high voltage state, the 32×17 bits CAM 22 drives the inputted linear address through the bit lines (bit) and the bit bar lines (/bit), to thereby compare the linear address with stored data and generate word hit signals WORD_hit based on each entry to the entry comparator block 24, wherein the entry is of 32 entries and the word hit signals WORD_hit are obtained through the use of the comparison result therebetween.

The 3-bit decoder 23 receives lower 3 bits of the linear address representing one of the entries and generates decoded signals of 8 bits which is relayed to the data RAM 25 and each of the entry comparators 24A to 24B through four ways.

Each of the entry comparators 24A to 24D receives an entry hit result WORD_hit of 8 bits from the tag CAM 22 via each way and a decoded signal WORD[7:0] of 8 bits from the decoder 23, to thereby generate hit signals of a high voltage state to the multiplexer 26 via a corresponding way.

The data RAM block 25 includes four columns of 8×20 bits data RAM's 25A to 25D and receives a decoded signal of 8 bits from the decoder 23 as a word line reading signal, to thereby read selected 20 cells connected to an enabled word line and generate data of 20 bits to the multiplexer 26 via each of the four ways.

The pre-charge multiplexer 26 is made up of 40 multiplexers, receives the data of 80 bits from the data RAM 25 through each of the bit lines and selects data of 20 bits outputted from one of the data RAMs 25A to 25D, namely a physical address, in response to a way hit signal of a high voltage state provided from the entry comparator block 24 to thereby generate the physical address of 20 bits.

Figure 3:
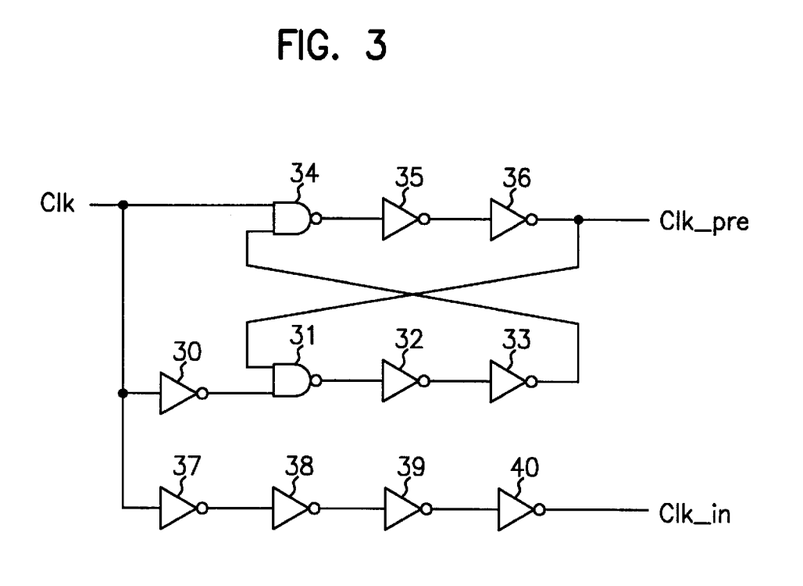
FIG. 3 illustrates a detailed block diagram of the clock generating block shown in FIG. 2.
Figure 4:
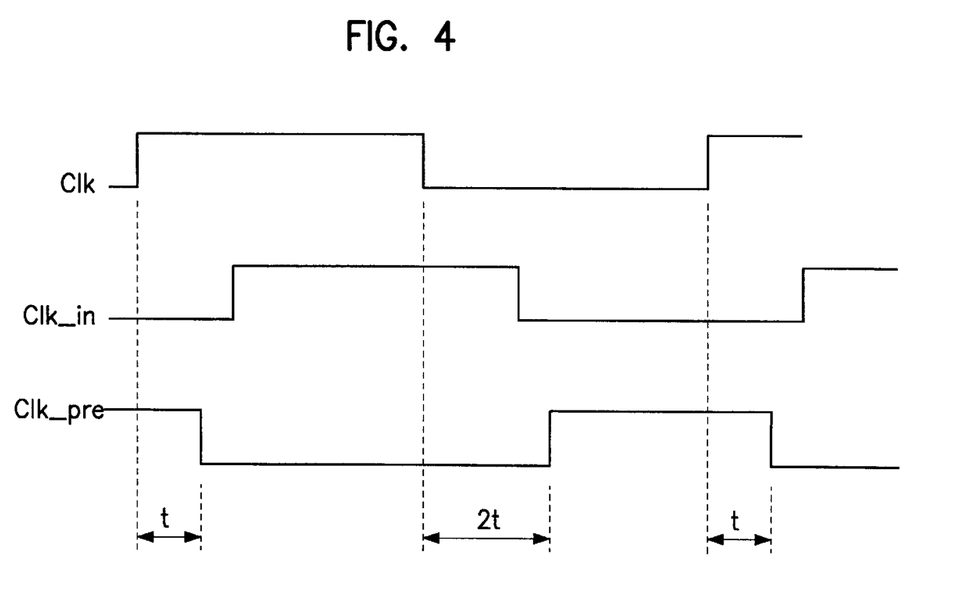
FIG. 4 provides a diagram representing timing of clocks generated from the clock generating block in FIG. 3.

Referring to FIGS. 3 and 4, there is illustrated a detailed block diagram of the clock generating block and a diagram showing timing of clocks generated from the clock generating block, in accordance with the present invention.

As shown, the control clock Clk_pre generated from the clock generating block 21, which is used in a precharging operation, is delayed by a predetermined time 2t from falling edge of a clock Clk inputted from the outside through two NAND gates 31 and 34 and five inverters 30, 32, 33, 35 and 36 and then converted into a rising edge; and is delayed by a predetermined time t from a rising edge of the clock Clk and then converted into a falling edge.

The enable clock Clk_in is converted into a rising edge through four inverters 37 to 40 after a falling edge of the control clock Clk_pre, and converted into the falling edge before a rising edge of the control clock Clk_pre.

Referring to the construction of the clock generating block 21, a first inverter 30 inverts a clock inputted from the system controller to couple the clock to one input terminal of a first NAND gate 31. The first NAND gate 31 receives the output of the first inverter 30 through one input terminal thereof and a control clock Clk_pre through the other input terminal thereof, to thereby an NAND operation of them. An output from the first NAND gate 31 is delayed by a second and a third inverters 32 and 33, and inputted to one input terminal of a second NAND gate 34. The second NAND gate 34 receives an output from the third inverter 33 through one input terminal thereof and a clock inputted from the system controller through the other input terminal thereof, to thus execute the NAND operation therefor. An output from the second NAND gate 34 is delayed by a fourth and a fifth inverters 35 and 36 and outputted as the control clock Clk_pre for a precharging operation to the tag CAM block 22, the entry comparator block 24 and the pre-charge multiplexer 26.

A clock from the system controller is delayed via four inverters 37 to 40 connected in a series fashion, then outputted as an enable clock Clk_in.

Figure 5:
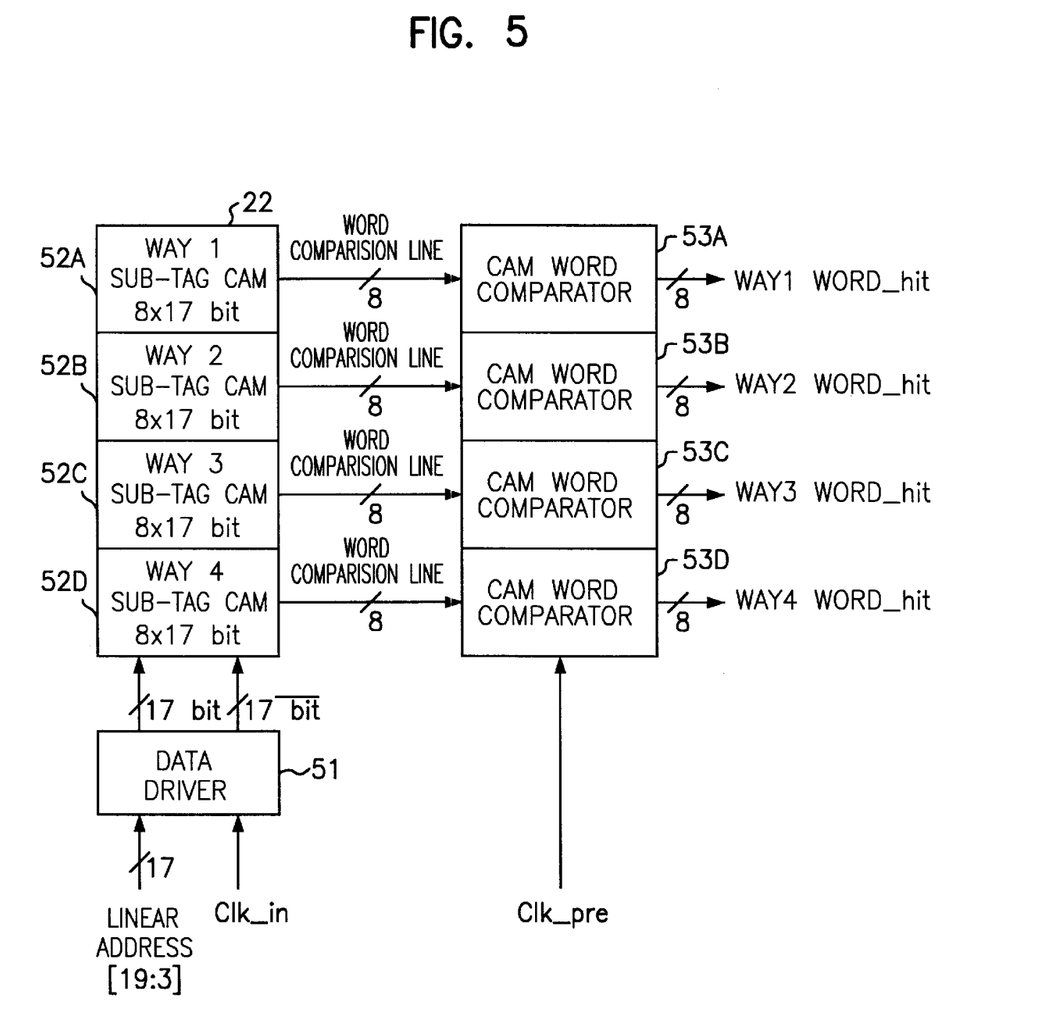
FIG. 5 offers a block diagram of a tag Content Address Memory(CAM) shown in FIG. 2.

Referring to FIG. 5, there is described the configuration of the tag CAM 22 in accordance with the present invention. The tag CAM 22 is constructed by using a data driver 51, four way blocks, i.e., sub-tag CAM's 52A to 52D and a CAM word comparator block 53 having four CAM word comparator 53A to 53D.

The data driver 51 receives upper 17 bits of a linear address from the system controller and an enable clock Clk__in from the clock generating block 21, and outputs the received data via bit lines (bit) of 17 bits and bit bar lines (/bit) of 17 bits in order to drive data stored at the sub-tag CAM's 52A to 52D.

The sub-tag CAM's 52A to 52D store data to be compared and compares the stored data with the linear address inputted from the data driver 51 via the bit lines (bit) and the bit bar lines (/bit) to thereby output signals representing a matched result.

The CAM word comparators 53A to 53D receive a control clock Clk__pre from the clock generating block 21 and precharges word comparison lines to output word hit signals based on a comparison result of each of the sub-tag CAM's 52A to 52B via each way WORD__hit.

Figure 6:
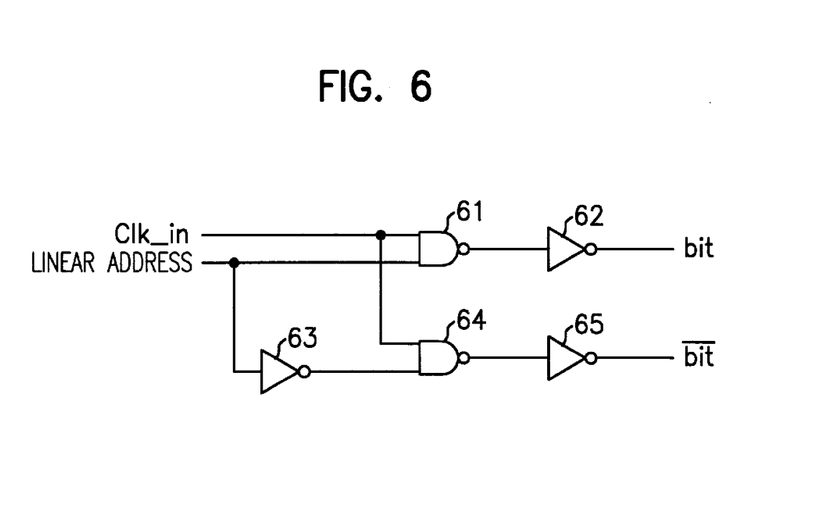
FIG. 6 sets forth a detailed circuit diagram of a data driver shown in FIG. 5.
Figure 7:
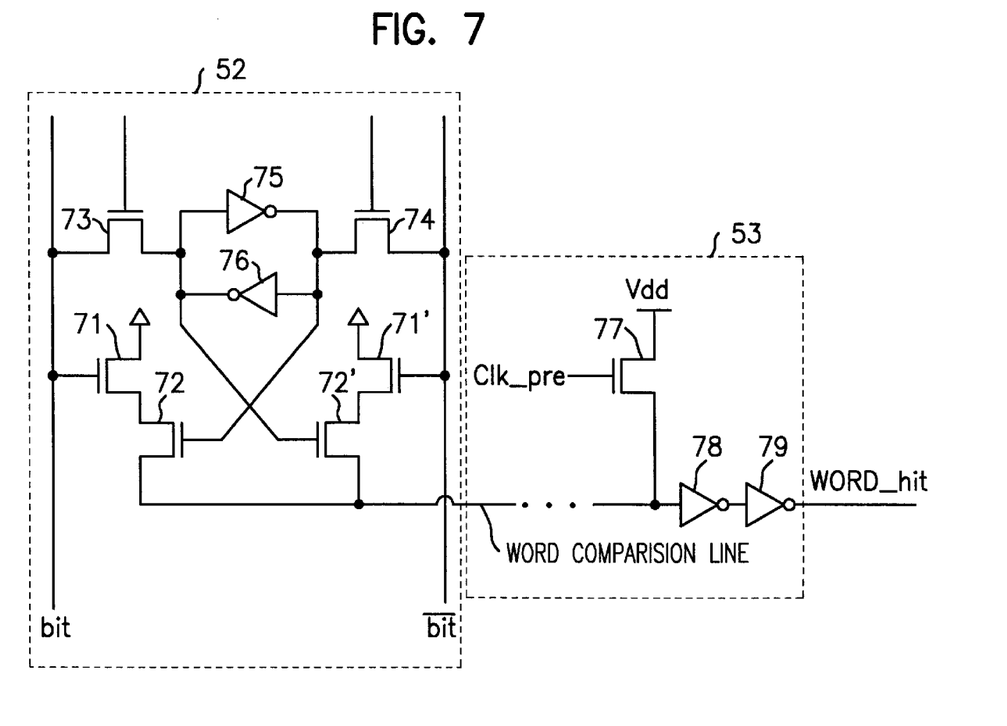
FIG. 7 presents a detailed circuit diagram of each sub-tag CAM in the invention.

Referring to FIGS. 6 and 7, there is shown a detailed block diagram of the data driver 51 in accordance with the present invention, and a diagram showing one preferred embodiment of the subtag CAMs 52A to 52D and the CAM word comparators 53A to 53D.

As shown, the data driver 51 is made up of a first NAND gate 61, a first inverter 62, a second inverter 63, a second NAND gate 64, and a third inverter 65. The first NAND gate 61 receives an enable clock Clk__in from the clock generating block 21 and a linear address from the outside, to thereby perform an NAND operation. The first inverter 62 inverts an output of the first NAND gate 61 to output the inverted data via the bit lines (bit). The second inverter 63 inverts the linear address from the system controller. The second NAND gate 64 serves to receive the enable clock Clk__in from the clock generating block 21 and the inverted linear address from the second inverter 63, to thereby process a NAND operation therefor. The third inverter 65 serves to invert an output from the second NAND gate 64 to output the inverted data through the bit bar lines (/bit).

That is to say, the data driver 51 outputs the linear address of 17 bits inputted from the outside to the cells of the subtag CAMs 52A to 52D via the bit lines (bit) and the bit bar lines (/bit) during a high voltage state of the enable clock Clk__in generated from the clock generating block 21.

Each of the sub-tag CAMs 52A to 52D has the volume of 8×17 bits and is made up of a first NMOS transistor 71, a second NMOS transistor 72, a third NMOS transistor 71', a fourth NMOS transistor 72' and a memory cell area 73 to 76.

In the first NMOS transistor 71, the bit line (bit) is connected to a gate electrode thereof, and grounding voltage and a channel are provided therein. In the second NMOS transistor 72, a channel thereof is formed between the first NMOS transistor 71 and a word comparison line. In the third NMOS transistor 71', the bit bar line (/bit) is connected to a gate electrode thereof, and the grounding voltage and a channel are provided therein. In the fourth NMOS transistor 72', a channel thereof is formed between the third NMOS transistor 71' and the word comparison line. The memory cell area 73 to 76 also includes two inverters.

The CAM word comparator 53 is configured by using an NMOS transistor 77 in which a control clock Clk__pre generated from the clock generating block 21 is connected to a gate electrode thereof and a channel is formed between the reference voltage Vdd and the word comparison line; and two inverters 78 and 79 connected in series fashion, for sensing and amplifying an electric potential of the word comparison line.

In the operation, the data is previously stored at the memory cell area 73 to 76, and the NMOS transistor 77 precharges the word comparison line by using the reference voltage Vdd when the control clock Clk__pre from the clock generating block 21 is inputted thereto in a high voltage state. When the linear address data from the data driver 51 via the bit lines (bit) and the bit bar lines (/bit) is inputted to the memory cell area 73 to 76 and such inputted data is same as the data previously stored at the memory cell area 73 to 75, the channels of the NMOS transistors 71, 71', 72 and 72' are not actuated so that the precharged reference voltage is sensed by two inverters 78 and 79, to thereby output a word hit signal WORD__hit in a high voltage state.

Meanwhile, if the data stored at the memory cell area 73 to 76 is not the same as the inputted data, the channels of two NMOS transistors 71 and 72 on the bit lines (bit) or the channels of two NMOS transistors 71' and 72' on the bit bar lines (/bit) are actuated so that the precharged reference voltage is discharged via the word comparison line and the grounding voltage tap. As a result, two inverters 78 and 79 sense the ground voltage to thereby output a word hit signal WORD__hit in a low voltage state as a non-matching signal.

Figure 8:
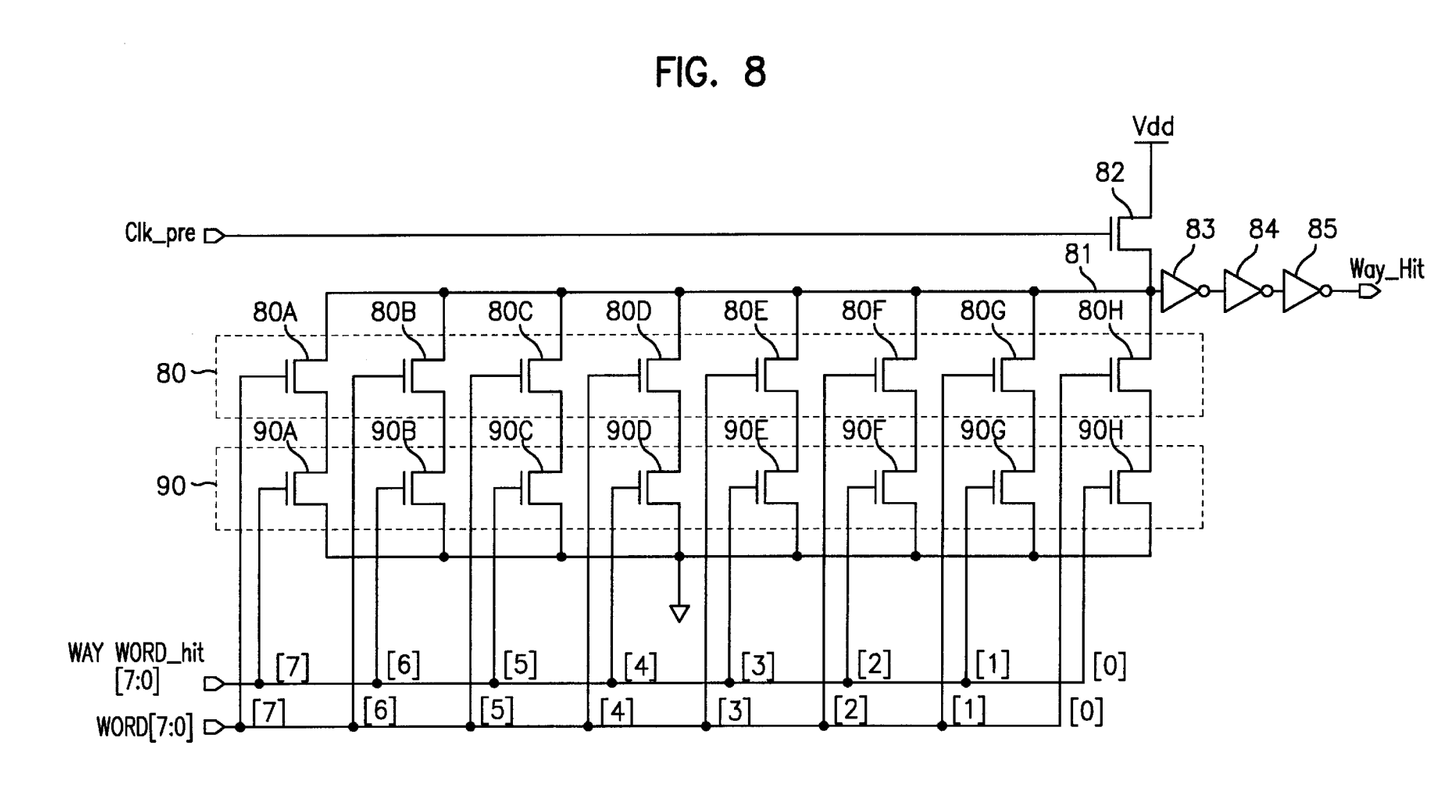
FIG. 8 provides a detailed circuit diagram of each entry comparator shown in FIG. 2.

Referring to FIG. 8, there is illustrated a detailed block diagram of an entry comparator in accordance with the present invention. The entry comparator includes a first NMOS transistor block 90, a second NMOS transistors block 91, an NMOS transistor 82 and three inverters 83, 84 and 85.

The first NMOS transistor block 90 includes 8 number of NMOS transistors 90A to 90H, wherein channels of the NMOS transistors 90A to 90H are commonly connected to a ground; and each bit line of the word hit signal WORD__hit outputted from the CAM comparator block 53 is coupled to each gate electrode thereof.

The second NMOS transistors 80 includes 8 number of NMOS transistors 80A to 80H, wherein each of their gates is connected to a bit line of the word lines WORD[7:0] outputted from the decoder 23; and their channels are connected between the channels of the first NMOS transistors 90A to 90H and a common output Way__hit thereof.

The channel of the NMOS transistor 82 is connected between the common output Way__hit and the reference voltage Vdd and the gate thereof is controlled by using the control clock Clk__pre of the clock generating block 21. As a result, the common output, i.e., the way hit line Way__hit, is precharged by using the reference voltage Vdd.

As may be seen from the above, the NMOS transistor 82 precharges the way hit line Way__hit by using the reference voltage Vdd during a high voltage state of the control clock Clk__pre inputted from the clock generating block 21.

Each pair of the first and second NMOS transistors 90A to 90H and 80A to 80H discharge the way hit line Way__hit, when a 1 bit word hit signal from the CAM word comparator 53 and a 1 bit decoding word from the decoder 23 represent a high voltage state..

The first inverter 83 senses the electric potential change of the way hit line, and the second inverter 84 inverts the sensed signal output from the first inverter 83. The third invert 85 then inverts the inverted sensed signal to thereby output the way hit signal Way__hit.

That is, when the inputted linear address is identical to the data stored at the tag CAM 22, 1 bit word hit signal among 8 bit word hit signals and 1 bit word among 8 bit words decoded on lower 3 bits of the linear address denote a high voltage state; the way hit line precharged by the reference voltage Vdd is discharged via a pair of the first and the second NMOS transistor by the grounding voltage. Such operation is sensed and amplified by using the first inverters 83, 84 and 85 to thereby output it as the way hit signal in a the high voltage state.

For example, when the inputted linear address is matched with the data stored in a second entry of the tag sub-tag CAM 52A shown in FIG. 5, the output WAY1 WORD__hit [7:0] from the tag CAM 22 is of "00000010". On the other hand, the lower 3 bits of line address is decoded by using the decoder 23 which generate an output signal WORD[1]. The NMOS transistor 80G and 90G are then controlled by the output WAY1 WORD __hit [1] from the tag CAM and the output WORD[1] from the decoder 24 to thereby form a discharge path for discharging the reference voltage on the way hit line to the ground. As a result, the low voltage state of the way hit line is then converted via the inverters 83, 84 and 85 into the high voltage state thereof, wherein the high voltage state represents an entry match; and 4 bits output from the entry comparator blocks 24 then represent the way which occurs the entry match. The way hit signal of 4 bits is then coupled to the pre-charge multiplexer 25.

As may be seen from the above, the entry comparator block 24 can detect through the operation on which way the hit occurs by using dynamic circuitries, and effectively outputs the detection result as the way hit signal.

Figure 9:
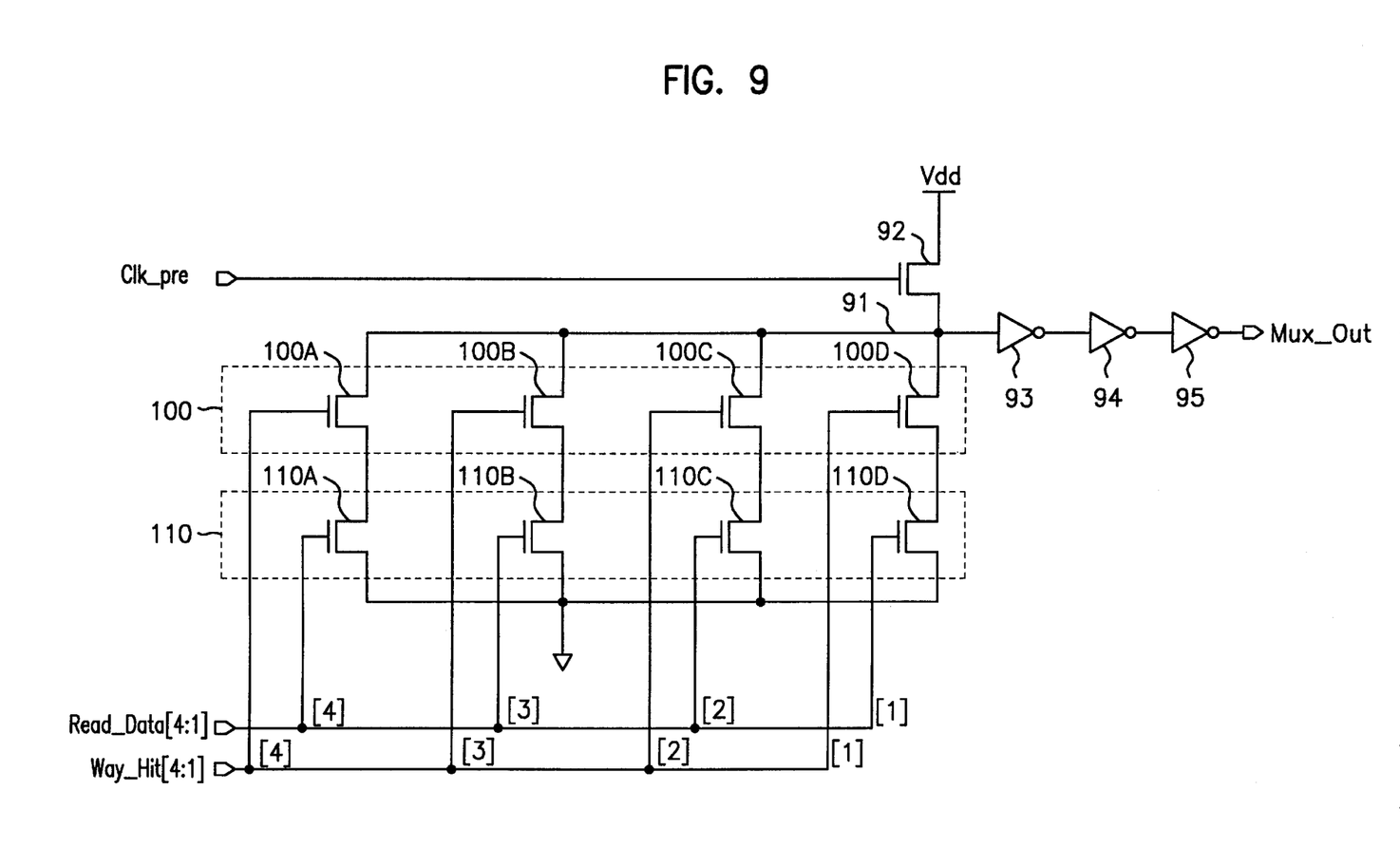
FIG. 9 depicts a detailed circuit diagram of a pre-charge block shown in FIG. 2.

Referring to FIG. 9, there is shown a circuit diagram of the pre-charge multiplexer contained in the pre-charge multiplexer block 26 in accordance with the present invention. The pre-charge multiplexer 26 includes a plurality, e.g., 20, of 4×1 pre-charge multiplexer wherein each includes a first NMOS transistor block 110, a second NMOS transistors block 100, an NMOS transistor 92 and three inverters 93, 94 and 95.

The first NMOS transistor block 110 includes a plurality, e.g., 8, of NMOS transistors 110A to 110D, wherein channels of the NMOS transistors 110A to 110D are commonly connected to a ground; and each bit line of the data signal Read__Data[4:1] outputted from the data RAM block 25 shown in FIG. 2 is coupled to each gate electrode thereof.

The second NMOS transistors 100 includes a plurality, e.g., 8 of NMOS transistors 100A to 100D, wherein each of their gates is connected to a bit line of the way hit lines Way__hit[4:1] outputted from the entry comparator block 24; and their channels are connected between the channels of the first NMOS transistors 110A to 110D and a common output Way__hit thereof, respectively.

The channel of the NMOS transistor 92 is connected between the common output line 91 and the reference voltage Vdd and the gate thereof is controlled by using the control clock Clk__pre of the clock generating block 21 shown in FIG. 2. As a result, the common output line 91 is precharged by using the reference voltage Vdd.

The first inverter 93 senses the electric potential change of the output line 91, and the second inverter 94 inverts the sensed signal output from the first inverter 93. The third invert 95 then inverts the inverted sensed signal to thereby output a multiplexed signal Mux__Out.

During a low voltage state of the control clock Clk__pre, when a bit of the way hit signal and a corresponding bit of the data signal simultaneously have a high voltage state, a corresponding pair of the NMOS transistors (100A and 110A), (100A and 110B), (100C and 110C) or (100D and 110D) form a discharge path for discharging the reference voltage on the output line 91 to the ground. As a result, the low voltage state of the output line 91 is then converted via the inverters 83, 84 and 85 into the high voltage state thereof to thereby generate the multiplexed signal Mux__Out having a high voltage state. Therefore, 20 number of the pre-charge multiplexers serve to generate 20 bits of the multiplexed output signal as 20 bit of the physical address by using 4 bits of the way hit signal.

As may be seen from the above, it should be readily appreciated that the pre-charge multiplexer block 26 can effectively access the data RAM by using dynamic circuitries.

Figure 10:
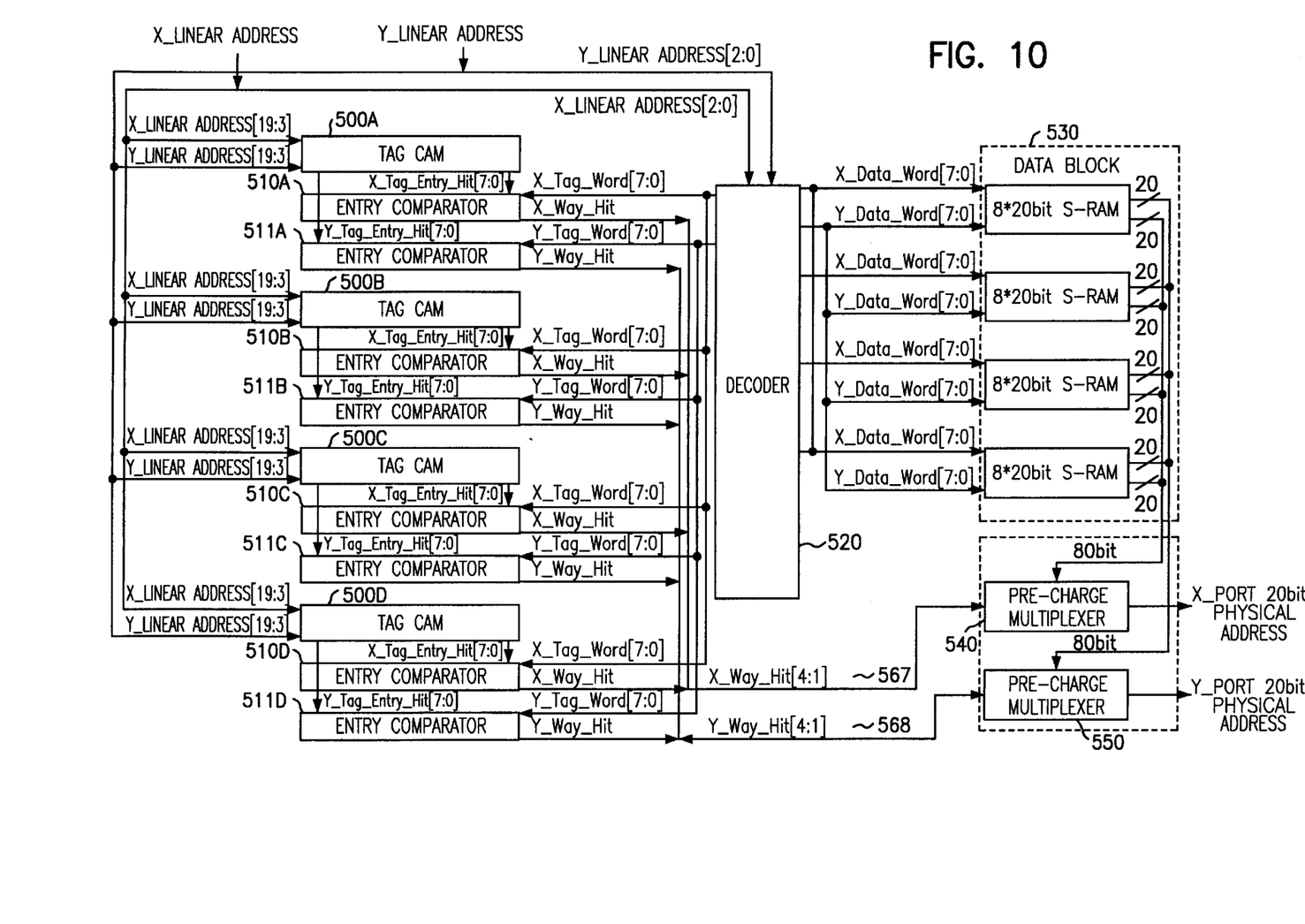
FIG. 10 is a block diagram of a TLB in accordance with another embodiment of the present invention.

Referring to FIG. there is shown a TLB in accordance with another embodiment of the present invention. The TLB includes 4 number of tag CAM blocks 500A to 500D, first entry comparator blocks 510A to 510D, second entry comparator 511A to 511D, a decoder block 520, data RAM block 530, and two pre-charge multiplexer blocks 540 and 550, which are similar to the components shown in Fig. except that the TLB has two linear address, e.g., X and Y linear address as inputs and two multiplexed outputs, e.g., X__port physical address and Y__port physical address.

As may be seen from the above, in the inventive TLB, there is no a need of a sensing process in a tag RAM by using a tag CAM, to thereby enable the system to operate at a high speed by a concurrent operation of tag and data regions and a reduction of an access time. The TLB can be further implemented in a smaller size than a conventional one.

Although the invention has been shown and described with respect to the preferred embodiments, it will be understood by those skilled in the art that various changes and modifications may be made without departing from the spirit and scope of the invention as defined in the following claims.

What is claimed is:

1. A translation lookaside buffer (TLB) for use of a microprocessor comprising:
    means for generating a control clock and an enable clock, said control clock being for precharging a clock applied from the outside by an optional reference voltage, said enable clock being for driving data;
    a content address memory (CAM) divided into a plurality of regions based on respective entries, for receiving the control clock and the enable clock from the clock generating means, comparing a linear address inputted from the outside with stored data, and generating hit signals through each of the regions thereof, wherein said hit signals represent whether or not its comparison result is a coincidence therebetween;
    means for receiving, from the outside, the linear address for distinguishing the respective entries, and decoding the linear address;
    hit signal generating means for receiving the control clock from said clock generating means and decoded data from the decoding means, and outputting selection signals, said selection signals indicating where the hit signals inputted from said CAM are generated;
    means divided into a multiple number of storing areas, for storing a physical address and outputting the data stored at memory cells corresponding to enabled word lines through each of the areas in response to the decoded data outputted from said decoding means;
    means for selecting one out of the physical addresses outputted from each area of the storing means in response to the selection signal provided from said hit signal generating means; and
    means for sensing a signal applied from the selection means.

2. The TLB of claim 1, wherein said clock generating means receives the clock from the outside and generates the control clock and the enable clock, said control clock being delayed by voluntary time 2t at a trailing edge of the clock inputted from the outside and converted into a leading edge, and delayed by voluntary time t at the leading edge of the clock and converted into the trailing edge;

said enable clock being converted into the leading edge after a conversion of said control clock into the trailing edge, and converted into the trailing edge before a conversion of said control clock into the leading edge.

3. The TLB of claim 1, wherein said clock generating means comprises:

first inverting means for inverting the clock inputted from the outside;

a first NAND gate for receiving an output from said first inverting means and an outputted control clock, to thereby perform a NAND operation;

means for delaying and outputting an output of said first NAND gate;

a second NAND gate for receiving said clock from the outside and an output from the delaying means, to thereby execute the NAND operation;

means for delaying an output from said second NAND gate and outputting the control clock; and means for delaying said clock inputted from the outside and outputting the enable clock.

4. The TLB of claim 3, wherein the delaying means is constructed by two or more inverters connected in series with each other.

5. The TLB of claim 1, wherein said CAM comprises:

driving means for receiving the linear address from the outside and the enable clock from said clock generating means and outputting the received data via bit lines and bit bar lines;

storing means divided into a multiple number of regions, for storing comparison data, comparing the stored comparison data with the linear address inputted from said driving means via the bit lines and the bit bar lines, and outputting its comparison result through each region thereof; and comparison means controlled by the control clock inputted from said clock generating means, for precharging word comparison lines by the optional reference voltage, said comparison means being connected to each region of said storing means and sensing and outputting comparison result signals provided from each region of said storing means.

6. The TLB of claim 5, wherein said driving means outputs the linear address inputted from the outside via the bit lines and the bit bar lines during a high state of the enable clock applied from said clock generating means.

7. The TLB of claim 6, wherein said driving means comprises:

a first NAND gate for receiving the enable clock from said clock generating means and the linear address from the outside, to thereby progress the NAND operation;

first inverting means for inverting an output of said first NAND gate and outputting inverted data via the bit lines;

second inverting means for inverting the linear address from the outside;

a second NAND gate for receiving the enable clock from said clock generating means and inverted linear address from said second inverting means, to thereby process the NAND operation; and third inverting means for inverting an output from said second NAND gate and outputting inverted data through the bit bar lines.

8. The TLB of claim 5, wherein said storing means is constructed by a size enough to contain data of 8×17 bits.

9. The TLB of claim 8, wherein said storing means comprises:

memory cells storing a given data value;

a first NMOS transistor whose gate electrode is connected to the bit lines, said first NMOS transistor being for outputting grounding voltage through a channel thereof;

a second NMOS transistor whose gate electrode is connected to contacts of said memory cells contacted with said bit bar lines, said second NMOS transistor having a channel thereof between said first NMOS transistor and the word comparison line;

a third NMOS transistor whose gate electrode is connected to the bit bar lines, said third NMOS transistor being for outputting the grounding voltage through a channel thereof; and a fourth NMOS transistor whose gate electrode is connected to the contacts of said memory cells contacted with the bit lines, said fourth NMOS transistor having a channel thereof between the third NMOS transistor and the word comparison line.

10. The TLB of claim 9, wherein said comparison means comprises:

means for receiving the control clock from said clock generating means and precharging said word comparison line by the optional reference voltage; and means for sensing a voltage value of said word comparison line and outputting a word hit signal.

11. The TLB of claim 10, wherein the precharging means comprises an NMOS transistor whose gate electrode is connected to the control clock, said NMOS transistor being for precharging said word comparison line by the optional reference voltage during the high state of the control clock.

12. The TLB of claim 11, wherein the sensing means is constructed by two or more inverters connected in series with each other.

13. The TLB of claim 12, wherein said hit signal generating mean s comprises:

means controlled by the control clock inputted from said clock generating means, for precharging a way hit line by the optional reference voltage;

a plurality of logic means for changing the voltage value of said way hit line when bits of the word hit signal inputted from the sensing means of said CAM and decoding bits inputted from said decoding means are all the high state; and means for sensing the voltage value of the way hit line, changed by said logic means and outputting the selection signal.

14. The TLB of claim 13, wherein the precharging means comprises an NMOS transistor whose gate electrode is connected to the control clock, said NMOS transistor being for precharging said way hit line by the optional reference voltage during the high state of the control clock.

15. The TLB of claim 13, wherein said logic means comprises:

a first NMOS transistor for receiving the bits of the word hit signal inputted from the sensing means of said CAM through a gate electrode thereof and outputting the grounding voltage via a channel thereof; and a second NMOS transistor for receiving the decoding bits from said decoding means through a gate electrode thereof, said second NMOS transistor having a channel thereof formed between the first NMOS transistor and the way hit line.

16. The TLB of claim 15, wherein said sensing means comprises:

means for sensing changed voltage of said way hit line; and means for inverting an output of the sensing means.

17. The TLB of claim 1, wherein the storing means comprises a random access memory (RAM) constructed by four columns of an 8×20 bits memory region.

18. The TLB of claim 17, wherein said selection means comprises a multiplexer for selecting, in response to the selection signal of said hit signal generating means, one memory region data among memory region data of four columns outputted from said RAM via the bit lines and the bit bar lines and outputting selected data via the bit lines and the bit bar lines.

* * * * *